(12) United States Patent
Zollmann

(10) Patent No.: US 7,448,834 B2
(45) Date of Patent: Nov. 11, 2008

(54) TOOL CLAMPING DEVICE

(75) Inventor: Martin Zollmann, Burladingen (DE)

(73) Assignee: Sauter Feinmechanik GmbH, Metzingen (DE)

( * ) Notice: Subject to any disclaimer, the term of this patent is extended or adjusted under 35 U.S.C. 154(b) by 0 days.

(21) Appl. No.: 11/649,358

(22) Filed: Jan. 4, 2007

(65) Prior Publication Data
US 2007/0206998 A1    Sep. 6, 2007

(51) Int. Cl.
*B23C 3/00*    (2006.01)
(52) U.S. Cl. .................................... 409/234
(58) Field of Classification Search ........... 409/231, 409/232, 234; 408/239 R; 279/1 A, 102, 279/103, 20, 75, 77, 81
See application file for complete search history.

(56) References Cited

U.S. PATENT DOCUMENTS

| | | | | | |
|---|---|---|---|---|---|
| 1,636,421 | A | * | 7/1927 | Knott | 279/75 |
| 2,433,127 | A | * | 12/1947 | Kinzbach | 279/77 |
| 3,219,355 | A | * | 11/1965 | Shigemit | 279/103 |
| 3,405,950 | A | * | 10/1968 | Cox | 279/103 |
| 3,708,178 | A | * | 1/1973 | Lauricella | 279/81 |
| 4,238,167 | A | * | 12/1980 | Brugger et al. | 409/232 |
| 4,673,319 | A | * | 6/1987 | Ishikawa | 409/234 |
| 5,340,127 | A | * | 8/1994 | Martin | 279/20 |
| 2006/0056932 | A1 | | 3/2006 | Neumeier | |

FOREIGN PATENT DOCUMENTS

| | | |
|---|---|---|
| EP | 0 059 513 | 9/1982 |
| EP | 0 061 075 | 9/1982 |
| WO | WO 2006/04259 A1 | 3/2006 |

\* cited by examiner

*Primary Examiner*—Dana Ross
(74) *Attorney, Agent, or Firm*—Roylance, Abrams, Berdo & Goodman, L.L.P.

(57) ABSTRACT

A tool clamping device has a spindle insert (10) and an adapter (12) between the spindle insert (10) and a toolholder (14). The adapter (12) can be pushed axially along the longitudinal axis (16) of the device into the holder (18) of the spindle insert (10), and can be fixed by a fastener (20). In addition to the fastener (20), between the spindle insert (10) and adapter (12), a torque transmission (22) establishes a positive connection between the spindle insert (10) and adapter (12). In this way, the fastener (20) is relieved of stresses and loads.

19 Claims, 2 Drawing Sheets

TOOL CLAMPING DEVICE

FIELD OF THE INVENTION

The present invention relates to a tool clamping device with a spindle insert and an adapter between the spindle insert and a toolholder. The adapter can be pushed axially relative to the longitudinal axis of the device into the holder of the spindle insert and can be fixed by fastening means.

BACKGROUND OF THE INVENTION

DE 102 19 600 B4 discloses a tool carrier for stationary or rotating tools with a collet holder made on the tool carrier for a collet for clamping the tool shaft from the tool side. The collet holder has a conical hole for holding the collet and a coaxial thread assigned to the hole for holding the clamping nut. A precision finish-machined first flat surface is assigned to a conical hole, and extends at a right angle to the axis of the hole on the tool carrier means. Fastening means on the tool carrier for a tool clamping insert is inserted into the conical hole with a conical holding pin instead of a collet. The fastening means is accessible exclusively from the tool side.

The known solution results in a tool carrier with an axially very short collet holder designed so that in an extremely small area also other tool holders such as a collet can be used. For the actual tool clamping process, in the known solution, in addition to the spindle insert and the adapter, a clamping nut for the tool can be fixed with the fastening means from the tool side, so that a corresponding diversity of parts is necessary for implementing the known solution.

DE 299 13 650 U1 discloses a generic tool clamping device with a spindle insert and an adapter between the spindle insert and the toolholder. The adapter can be pushed axially into the spindle insert and can be attached to it by at least one screw as the fastening means. The adapter in its front area has at least one groove extending in the longitudinal direction and opening on its end into a recess running transversely to it, and can be inserted into the spindle insert by the adapter via at least one screw tip of the fastening means projecting into the interior of the spindle insert. By subsequent twisting of the adapter, the screw tip of the fastening means projects into the recess and, in this way, secures the adapter against falling out of the spindle insert. In this known generic solution, the adapter is held solely in the spindle insert via the contact forces of the respective screw fastening means. This arrangement leads in the axial direction to a corresponding large tool clamping device. Especially for impact-like application of force to the machining tool with application of a high torque to the adapter with the tool, unwanted relative motion between the adapter and tool insert is possible in the form of a slipping or sliding process which releases the connection.

SUMMARY OF THE INVENTION

An object of the present invention is to provide an improved tool clamping device having a low axial overall length and having, even for machining with a highly loaded tool, secure fixing between the tool adapter and spindle insert.

This object is basically achieved by a tool clamping device having the fastening means for fixing the adapter in the spindle insert between the spindle insert and adapter, and a torque transmission establishing a positive connection between the spindle insert and adapter. The fastening means is relieved of stresses and loads which occur especially to a considerable degree when impact-like application of machining forces to the tool and/or in machining processes with high torque transmissions causes a departure from the range of conventional cutting forces. Due to the separate torque transmission, the fastening means is relieved such that in any case it can securely fix the adapter in the spindle insert during metal cutting with the tool. It is surprising to one skilled in the art in the field of cutting that in spite of providing a separate torque transmission for the actual fastening means, installation space can be saved so that the present invention is dimensioned to be correspondingly small in the axial direction. No separate parts, such as for example a clamping nut, are necessary to achieve secure fixing of the machining chain, including of the cutting tool, adapter and spindle insert.

In one especially preferred embodiment of the tool clamping device of the present invention, the actual machining tool is fixed in the tool holder by another fastening means, preferably by a screw. This fastening means engages a flat recess in the cylindrical shaft of the machining tool. With the torque transmission of the present invention, it is ensured that this fastening site is secured such that unintentional slippage of the tool in the tool holder of the adapter at the location of engagement of the fastening means is reliably avoided. In another preferred embodiment, one fastening means is in the form of a fastening screw enabling transverse engagement by the spindle insert. In this way, a tightening moment for the adapter in the direction of the base of the spindle insert can be achieved. In particular, when the adapter has a conical holding piece on its free end, as a result a reliable, play-free fixing possibility is achieved.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
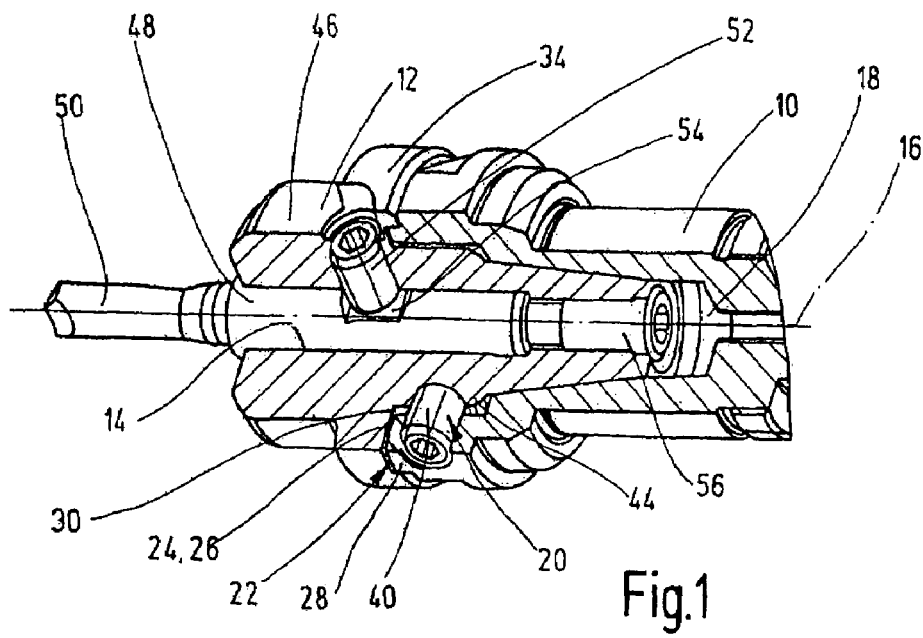
FIG. 1 is a schematic, not-to-scale, perspective view partially in section of a tool clamping device, according to a first embodiment of the present invention.

The tool clamping device shown in FIG. 1 has a spindle insert 10 and an adapter 12. The adapter 12 extends between the spindle insert 10 and a tool holder 14. The adapter 12 can be reversibly or removably inserted in a holder 18 of the spindle insert 10 axially to the longitudinal direction or axis 16 of the device. Furthermore, the adapter 12 in the spindle insert 10 can be fixed by a fastening means or fastener 20. In addition to the fastening means 20, between the spindle insert 10 and the adapter 12, a torque transmission 22 produces a positive connection between the spindle insert 10 and the adapter 12. As shown in FIG. 1, on the facing front sides 24, 26 of the spindle insert 10 and adapter 12, at least one axial projection 28 on one of those parts, here the spindle insert 10, positively engages a corresponding axial recess 30 in the other part, here the adapter 12, with formation of the torque transmission 22.

Figure 4A:
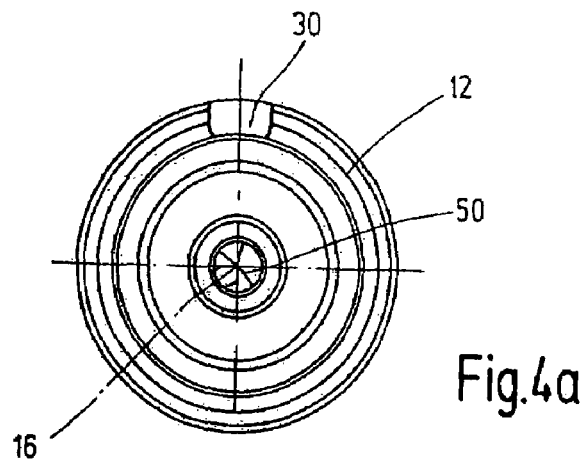
FIG. 4a is a rear, elevational view of the torque transmission of the adapter in FIGS. 1 to 3.
Figure 4B:
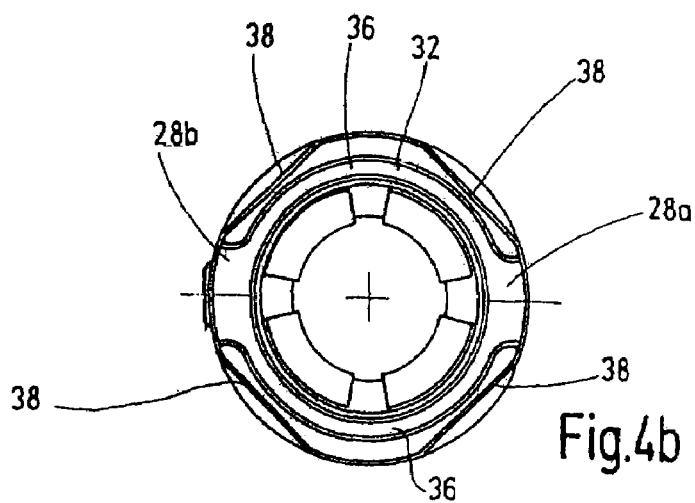
FIG. 4b is a front, elevational view of the spindle insert for a tool clamping device according to a second embodiment of the present invention.

For the sake of simpler representation, the front sides 24, 26 are shown with formation of a gap at a distance. In the actual implementation, this gap distance can be set to zero. The projection 28 comprises a block-like material projection on the front side 26 of the spindle insert 10. Instead of a single projection 28, in a modified embodiment as shown in FIG. 4*b*, the projection can be repeatedly present on the front-side outer periphery of the spindle insert 10. Thus, for example, the embodiment illustrated in FIG. 4*b* shows two projections 28*a,b* diametrically opposite one another relative to the longitudinal axis 16. In this case, two corresponding recesses (not shown) on the other part are necessary. As in the illustrated embodiments, it is of course possible to assign a projection to the adapter 12 or the spindle insert 10 in an alternating sequence. Likewise, it is within the scope of the present invention to configure the respective projection 28 on the front side 24 of the adapter 12. To achieve reliable relief of the first fastening means 20, in any case, the illustrated torque transmission 22 should be located at a location different therefrom in the tool clamping device.

The spindle insert 10 on its one free front side 26 has a step-shaped shoulder 32 used to extend under the annular flange segment 34 of the adapter 12. In the first embodiment as illustrated in FIGS. 1 and 4*a*, as already shown, only one rectangular projection 28 extends into the recess 30 of the adapter 12. In the embodiment as shown in FIG. 4*b*, the respective projections 28*a, b* of the torque transmission 22 are interconnected via connecting bridges 36 extending in arcs to the exterior and oriented around the longitudinal axis 16 of the device. In particular, as shown in FIG. 4*b*, two projections 28*a,b* extend diametrically opposite one another to the longitudinal axis 16 of the device, and preferably likewise extend opposite the arc-shaped connecting bridges 36. In FIG. 4*b*, outside the two connecting bridges 36 with formation of a step-shaped shoulder 32, the spindle insert (10) is cut free and has these flat bearing surfaces 38 for the action of an actuating tool, for example, in the form of an actuating wrench with a definable jaw width (not shown).

Figure 2:
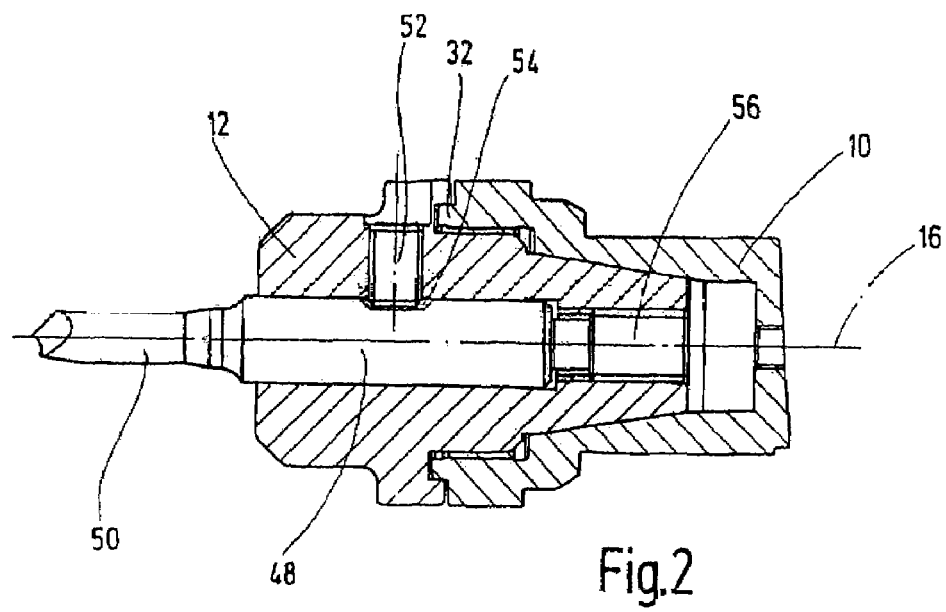
FIGS. 2 and 3 are side, elevational views in section of the tool clamping device shown in FIG. 1.
Figure 3:
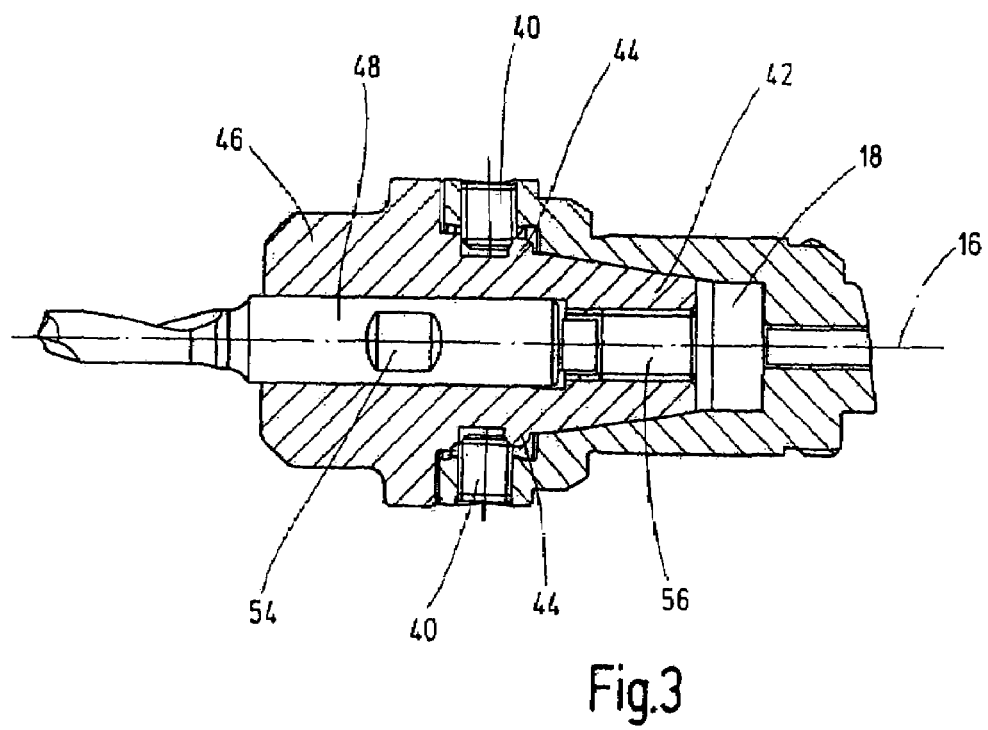

As shown in FIG. 3, the fastening means 20 comprises two fastening screws 40 arranged diametrically opposite one another relative to the longitudinal axis 16 and provided with chamfered inner ends. The screw-in direction for the two fastening screws 40 is selected to be transverse to the longitudinal axis 16 of the device, such that the conical end piece 42 of the adapter 12 is pulled or pushed into the holder 18 of the spindle insert 10 upon completed fixing. So that the end of the respective fastening screw 40 can act on the adapter 12 as required, adapter 12 is provided, at least in regions or segments on one end of the conical end piece 42 with an annular shoulder 44 which widens in diameter. Proceeding from the annular shoulder 44, the adapter 12 widens in turn to the exterior. In this way, adapter 12 forms a holding ring 46 which encompasses the tool shaft 48 of an actuating tool in the area of its free end. To fix the machining tool 50 in the tool holder 14 of the adapter 12, another fastening means or fastener 52 is used in the form of a fastening screw. This fixing situation for the tool 50 is shown especially in FIG. 2. For the action of the other fastening means 52 in the form of a screw, the tool 50 is provided on its cylindrical tool shaft 48 with a groove-like recess 54 with a groove base which runs flat. One fastening means 20 therefore extends through the spindle insert 10 and acts on the adapter 12 to fix it. The other fixing means 52 extends through the adapter 12 and acts on the tool 50 to fix it. Due to the relief by the positive locking of the torque transmission 22, it is ensured in this respect for the other fixing means 52 that it cannot slide out of the recess 54. This could obviate the necessity of fixing the machining tool 50 in the adapter 12 and therefore in the spindle insert 10.

The tool clamping device of the present invention is small in the axial direction, securely fixes the machining tool 50 with the adapter 12 in the spindle insert 10, and prevents damaging relative movements between those parts, and possibly failure of the individual fastening means 20 and 52. Within the conical end piece 42 of the adapter 12, a stop piece 56 is held by a thread. The stop piece permits fixing the possible insertion depth for the tool 50 along the longitudinal axis 16 of the device by a length setting process. In addition to the drilling tool 50 shown in the figures, for example, a milling cutter, an inside piercing tool and the like can be held in the illustrated holder configuration. Furthermore, the tool 50 when worn can be replaced by a new one. If the spindle insert 10 is a component of a spindle head (not shown), this configuration, preferably in so-called turret-type tool heads, especially turret-type disks, can be used. Moreover it is possible to hold the spindle insert 10 stationary and to drive the workpiece (not shown), for example, for drilling or turning via a machine turning attachment (not shown), or with the workpiece held stationary, to drive the spindle insert, for example, via a rotary tool holder (not shown) for a cutting process. Likewise, in special cases, by relative movement to one another both the tool and the workpiece can be driven. Furthermore, the present invention is not limited to the adapter 12 with conically running end pieces 42. Rather, tool designs are also conceivable in which the end piece is made cylindrical (not shown).

While various embodiments have been chosen to illustrate the invention, it will be understood by those skilled in the art that various changes and modifications can be made therein without departing from the scope of the invention as defined in the appended claims.

What is claimed is:

1. A tool clamping device, comprising:
   a spindle insert extending along a longitudinal axis and having a holder therein;
   an adapter received within said holder along said longitudinal axis, said adapter having a conical end piece and an annular shoulder;
   a toolholder coupled to said adapter, with said adapter being between said spindle insert and said toolholder;
   first and second fastening screws releasably securing said adapter in said holder, said screws extending diametrically opposite one another relative to said longitudinal axis and being transverse to said longitudinal axis, inner ends of said screws engaging said annular shoulder to force and retain said conical end piece along said longitudinal axis into said holder as said screws are threaded radially inwardly toward said longitudinal axis; and
   a torque transmission positively connecting said spindle insert and said adapter transmitting torque forces therebetween.

2. A tool clamping device according to claim 1 wherein said spindle insert and said adapter comprise front sides facing one another, said torque transmission including at least one projection on one of said front sides engaging a corresponding recess in the other of said front sides.

3. A tool clamping device according to claim 2 wherein said front side of said spindle insert is a free front side thereof having a step-shaped shoulder extending under an annular flange segment of said adapter, said projection axially extending from said free front side.

4. A tool clamping device according to claim 1 wherein said spindle insert and said adapter comprise front sides facing one another, said torque transmission including axial projections interconnected by connecting bridges extending in arcs around said longitudinal axis on one of said front sides and including corresponding axial recesses for said projections in the other of said front sides.

5. A tool clamping device according to claim 4 wherein two of said projections extend diametrically opposite one another relative to said longitudinal axis, and have said connecting bridges extending between said two of said projections and opposite one another.

6. A tool clamping device according to claim 4 wherein spaced from said connecting bridges, said spindle insert comprises a step-shaped shoulder having bearing surfaces for engaging an actuating tool and being cut free.

7. A tool clamping device according to claim 1 wherein a tool fastener secures a tool in said toolholder.

8. A tool clamping device according to claim 7 wherein said tool comprises a cylindrical shaft having a recess engaging said tool fastener.

9. A tool clamping device according to claim 8 wherein said tool fastener is an individual screw.

10. A tool clamping device according to claim 7 wherein said first and second fastening screws extend through said spindle insert, and engage and secure said adapter; and said tool fastener extends through said adapter and secures said tool.

11. A tool clamping device, comprising:

a spindle insert extending along a longitudinal axis and having a holder therein and a front side perpendicular to said longitudinal axis;

an adapter received within said holder along said longitudinal axis, said adapter having a conical end piece, an annular shoulder and a front side and a front side perpendicular to said longitudinal axis and facing said front side of said spindle insert;

a toolholder coupled to said adapter, with said adapter being between said spindle insert and said toolholder;

first and second fastening screws releasably securing said adapter in said holder, said screws extending diametrically opposite one another relative to said longitudinal axis and being transverse to said longitudinal axis, inner ends of said screws engaging said annular shoulder to force and retain said conical end piece along said longitudinal axis into said holder as said screws are threaded radially inwardly toward said longitudinal axis; and at least one axially extending first projection on one of said front sides engaging a corresponding axially extending first recess in the other of said front sides to transmit torque about said longitudinal axis between said spindle insert and said adapter.

12. A tool clamping device according to claim 11 wherein said front side of said spindle insert is a free front side thereof having a step-shaped shoulder extending under an annular flange segment of said adapter, said projection extending from said free front side.

13. A tool clamping device according to claim 11 wherein a second axial projection is interconnected to said first projection by connecting bridges extending in arcs around said longitudinal axis on the one of said front sides; and a second corresponding axial recess for said second projection is in the other of said front sides.

14. A tool clamping device according to claim 13 wherein said projections extend diametrically opposite one another relative to said longitudinal axis, and have said connecting bridges extending between said two of said projections and opposite one another.

15. A tool clamping device according to claim 13 wherein spaced from said connecting bridges, said spindle insert comprises a step-shaped shoulder having bearing surfaces for engaging an actuating tool and being cut free.

16. A tool clamping device according to claim 11 wherein a tool fastener secures a tool in said toolholder.

17. A tool clamping device according to claim 16 wherein said tool comprises a cylindrical shaft having a recess engaging said tool fastener.

18. A tool clamping device according to claim 17 wherein said tool fastener is an individual screw.

19. A tool clamping device according to claim 16 wherein said first and second fastening screws extend through said spindle insert, and engage and secure said adapter; and said tool fastener extends through said adapter and secures said tool.

* * * * *